(12) United States Patent
Alt

(10) Patent No.: US 7,519,104 B2
(45) Date of Patent: Apr. 14, 2009

(54) APPLICATION OF SPREADING CODES TO SIGNALS

(75) Inventor: Daniel Edward Alt, Royston (GB)

(73) Assignees: MStar Semiconductor, Inc. (KY); MStar Software R&D, Ltd., Shenzen (TW); MStar France SAS, Issy les Mouineaux (FR); MStar Semiconductor, Inc. (TW)

( * ) Notice: Subject to any disclaimer, the term of this patent is extended or adjusted under 35 U.S.C. 154(b) by 661 days.

(21) Appl. No.: 10/547,426

(22) PCT Filed: Feb. 27, 2004

(86) PCT No.: PCT/GB2004/000795

§ 371 (c)(1),
(2), (4) Date: Aug. 29, 2005

(87) PCT Pub. No.: WO2004/077693

PCT Pub. Date: Sep. 10, 2004

(65) Prior Publication Data

US 2006/0256840 A1 Nov. 16, 2006

(30) Foreign Application Priority Data

Feb. 28, 2003 (GB) ................................. 0304680.2
Nov. 4, 2003 (GB) ................................. 0325730.0

(51) Int. Cl.
*H04B 1/00* (2006.01)
(52) U.S. Cl. .................... 375/146; 375/141; 375/147
(58) Field of Classification Search ............... 375/140, 375/141, 146, 147
See application file for complete search history.

(56) References Cited

U.S. PATENT DOCUMENTS 6,490,267 B1 * 12/2002 Kim et al. ............... 370/342
7,174,356 B2 * 2/2007 Agami et al. ............ 708/622

FOREIGN PATENT DOCUMENTS

| EP | 0 661 829 A2 | 7/1995 |
| EP | 0 854 586 A2 | 7/1998 |
| EP | 1 124 345 A2 | 8/2001 |
| GB | 2 338 157 A | 12/1999 |
| GB | 2 358 564 A | 7/2001 |
| WO | WO 01/50646 A1 | 7/2001 |

* cited by examiner

*Primary Examiner*—David B Lugo
(74) *Attorney, Agent, or Firm*—Edell, Shapiro & Finnan, LLC

(57) ABSTRACT

A method for applying one or more code values to an input signal value to produce an output signal value in a CDMA communications scheme, wherein the code value or values may lie only either on or equally distant from an orthogonal pair of axes defining a two dimensional signal space, the input and output signal values each have components along each axis and the method comprises processing, via a logic function, the code value or values to produce two multiplier values and a selector value, creating two product values by multiplying the multiplier values with respective components of the input signal value, negating one of the product values to produce a third product value and selecting, on the basis of the selector signal, two of the three product values to become the components of the output signal value.

14 Claims, 7 Drawing Sheets

| A | B | C | D | E |
|---|---|---|---|---|
| 0 | 0 | 0 | 0 | 0 |
| 0 | 0 | 1 | 0 | 1 |
| 0 | 1 | 0 | 1 | 0 |
| 0 | 1 | 1 | 1 | 1 |
| 1 | 0 | 0 | 1 | 1 |
| 1 | 0 | 1 | 1 | 0 |
| 1 | 1 | 0 | 0 | 1 |
| 1 | 1 | 1 | 0 | 0 |

Figure 3

| D | E | F | G | H | K | M | N | P |
|---|---|---|---|---|---|---|---|---|
| 0 | 0 | f | g | f | g | -g | f | g |
| 0 | 1 | f | g | -f | -g | g | -f | -g |
| 1 | 0 | f | g | f | g | -g | -g | f |
| 1 | 1 | f | g | -f | -g | g | g | -f |

APPLICATION OF SPREADING CODES TO SIGNALS

CROSS REFERENCE TO RELATED APPLICATIONS

This application is a national phase application based on international application no. PCT/GB2004/000795, filed Feb. 27, 2004, which claims the priority of Great Britain Patent Application Nos. 0304680.2, filed Feb. 28, 2003, and 0325730.0, filed Nov. 4, 2003, the content of all of which is incorporated herein by reference.

The invention relates to methods and apparatus for spreading and/or despreading communications signals.

As is well known, spreading codes are applied to communications signals in code division multiple access (CDMA) schemes. Spreading codes are used to produce spread-spectrum signals in signal transmission processes and are also used to despread spread-spectrum signals in signal reception processes.

At least in so far as the current Universal Mobile Telephone System (UMTS) standards are concerned, the process of spreading a signal is defined as the application of at least one of a scrambling code and a channelisation code to the signal. The UMTS standards define the scrambling code as a sequence of complex values each having real and imaginary parts. The UMTS standards define the channelisation code as a sequence of wholly real values. A scrambling code and a channelisation code can be applied sequentially to a signal to be spread or despread. Alternatively, a scrambling code and a channelisation code can be multiplied together such that their product is then applied to a signal to be spread or despread.

FIG. 8 shows a prior art circuit for spreading or despreading an input signal (whose values have the complex format f+jg) by the application of a scrambling code (whose values have the complex format a−jb) and a channelisation code (whose values are real and denoted as c). As shown in FIG. 8, the circuit comprises a scrambling code generator 50, a channelisation code generator 52, a NOT gate 56, two XOR gates 58 and 59, five multipliers 60, 62, 64, 68 and 70 and two adders 72 and 74. The inputs to the circuit are a, b, c, f and g and the real and imaginary components of complex values emerge from the adders 72 and 74 respectively. The emergent complex values form a spread signal if the circuit is being used for spreading, whereas, if the circuit is being used for despreading, the emergent complex values can be accumulated over symbol periods.

The XOR gates 58 and 59 combine the parts of the values of the scrambling and channelisation codes and the multipliers 60, 62, 64 and 70 form products on the basis of the components of input signal values and the outputs of the XOR gates 58 and 59. Multiplier 68 multiplies the output of multiplier 70 by −1, thereby performing a negation. The products formed by the multipliers are then combined in adders 72 and 74 to produce the components or values of the output signal.

One object of the invention is to provide an alternative scheme for applying spreading codes to signals to achieve spreading or despreading.

According to one aspect, the invention provides CDMA communications apparatus for applying one or more code values to an input signal value to produce an output signal value, wherein the code value or values may lie only either on or equidistant from an orthogonal pair of axes defining a two dimensional signal space, the input and output signal values each have components along each axis and the apparatus comprises logic means for combining the code value or values to produce two multiplier values and a selector value, multiplying means for creating two product values by multiplying the multiplier values with respective components of the input signal value, negating means for negating one of the product values to produce a third product value and selecting means for selecting, on the basis of the selector value, two of the three product values to become the components of the output signal value.

The invention also consists in a method for applying one or more code values to an input signal value to produce an output signal value in a CDMA communications scheme, wherein the code value or values may lie only either on or equidistant from an orthogonal pair of axes defining a two dimensional signal space, the input and output signal values each have components along each axis and the method comprises processing, via a logic function, the code value or values to produce two multiplier values and a selector value, creating two product values by multiplying the multiplier values with respective components of the input signal value, negating one of the product values to produce a third product value and selecting, on the basis of the selector signal, two of the three product values to become the components of the output signal value.

Thus, the invention provides a scheme for applying spreading codes to signals, for the purpose of despreading or spreading.

Advantageously, it is possible to implement the invention in hardware in a manner which uses less silicon area Specifically, this saving can be achieved by using fewer adders and fewer multipliers than the known art discussed above. Also, it is possible, in conjunction with certain embodiments of the invention, to use a smaller number of bits to represent each of the complex components of a value of the output signal than the known art discussed above, which enables components which manipulate values of the output signal to be designed to occupy less silicon area.

In one embodiment, there is a single code value to be applied to the input signal value. The code value is equidistant from, and has components along, the axes mentioned above. The logic means is arranged to pass one of the components of the code value as the multiplier values and to XOR the code value components to produce the selector signal.

In another embodiment, there are first and second code values for application to the input signal. The first code value is equidistant from, and has components along, the axes mentioned above and the second code value lies on one of those axes. The logic means is arranged to XOR a component of the first code value with the second code value to produce a value for use as both multiplier values and to XOR the first code value components to produce the selector signal.

In another embodiment, there are first, second and third code values for application to the input signal. The first code value is equidistant from, and has components along, the axes mentioned above. The second and third code values each lie on one of the axes (not necessarily the same one). The logic means is arranged to XOR one of the components of the first code value with one of the second and third code values and to XOR the other of the components of the first code value with the other of the second and third code values in order to produce the multiplier values. The logic means is also arranged to XOR the first code value components to produce the selector value.

In another embodiment, there are first, second and third code values for application to the input signal. Unlike the embodiment described in the preceding paragraph, the first and second codes are each equally distant from, and have components along, the axes. The third code value lies on one of the axes. The logic means is arranged to XOR the components of the first code, XOR the components of the second code, XOR the results of those XOR operations and adjust the result by a NOT function to produce the selector value. The logic means is also arranged to provide the components of the first and second codes to a group of AND gates, some of whose inputs are inverted. The outputs of the AND gates are combined in an OR gate, whose output is then XORed with the third code value to produce both multiplier values.

In some embodiments, there is a discrepancy between the manner in which the invention applies the codes to the input signal value and a desired process multiplying the input signal value by the code value or values. In such embodiments, it is sometimes desirable to use means for rotating the output signal value by 45° about the origin of the phase space axes. This rotation takes account of a phase element of the discrepancy. In some embodiments where a discrepancy exists, it may be unnecessary to attempt a correction because of, for example, a cancellation of the discrepancy between a pilot channel and data channel.

In a preferred embodiment, the invention is deployed within a participant of a wireless-communications network using a CDMA communications scheme.

By way of example only, certain embodiments of the invention will now be described with reference to the accompanying figures, in which:

FIG. 3 is a truth table describing the production of the outputs of the XOR gates in FIG. 2;

FIG. 4 is a truth table describing how the outputs of the XOR gates in FIG. 2 are processed;

Figure 1:
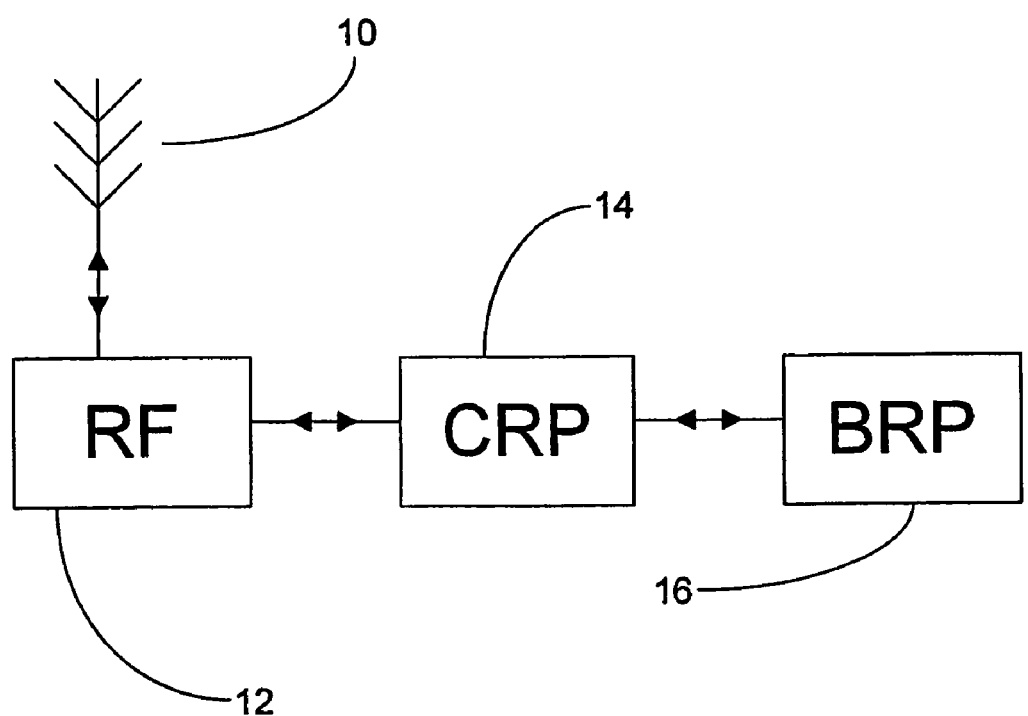
FIG. 1 is an overview of a radio telephone enabled for CDMA communications.

The mobile telephone shown in FIG. 1 is capable of communicating using a CDMA scheme. FIG. 1 shows only the most basic elements of the telephone, namely an antenna 10, a radio frequency (RF) section 12, a chip rate processor (CRP) 14 and a bit rate processor (BRP) 16. The functions of these elements will now be described in brief from the perspectives of signal transmission and reception.

In the context of signal transmission, the BRP produces an information signal representing, say, digitised speech. The information signal is encoded to make it less susceptible to errors. The information signal is supplied to the CRP 14 which applies one or more spreading codes to the information signal. The CRP produces a spread-spectrum version of the information signal and the spread-spectrum signal is provided to the RF section for modulation onto a RF carrier wave. The modulated RF carrier wave then undergoes power amplification and is transmitted from antenna 10.

In the context of signal reception, modulated carrier waves arrive at the antenna 10 and are demodulated by the RF section 12 to recover a base-band spread-spectrum signal. The spread-spectrum signal is then passed to the CRP 14 which performs a despreading operation using, for example, a rake receiver algorithm. The output of the CRP 14 is a despread information signal which can be processed by the BRP 16 to recover, for example, digitised speech for presentation to the user of the telephone.

The CRP 14 is responsible for the spreading of information signals to be transmitted and for despreading received baseband spread-spectrum signals. Both of these roles involve the application of one or more spreading codes or spreading signals to the CRP input. The base-band spread-spectrum signals passing between the RF section 12 and the CRP 14 comprise a series of data elements called chips and these signals are said to be at the "chip rate". Information signals passing between the BRP 16 and the CRP 14 comprise sequences of data elements called symbols and these signals are said to be at the "symbol rate". Sometimes, the BRP is known as a symbol rate processor.

The relationship between chips and symbols can be outlined as follows. Consider the case where a single spreading code, comprising a sequence of values, is to be used. In the context of spreading an information signal for transmission purposes, the rate of application of the values of the exemplary code to the symbols is typically such that several values of the code are applied to each symbol, the application of each value generating a chip. In the context of despreading, for reception purposes, a spread-spectrum signal that was created using the exemplary code, each value of the exemplary spreading code is applied to a respective chip of the base-band spread-spectrum signal (with the code being recirculated as necessary to process all of the chips). The results of this process are accumulated over the duration of each symbol period in order to recover a stream of symbols constituting an information signal.

The process by which the CRP 14 applies spreading codes to chip or symbol rate signals will now be discussed with reference to FIG. 2.

Figure 2:
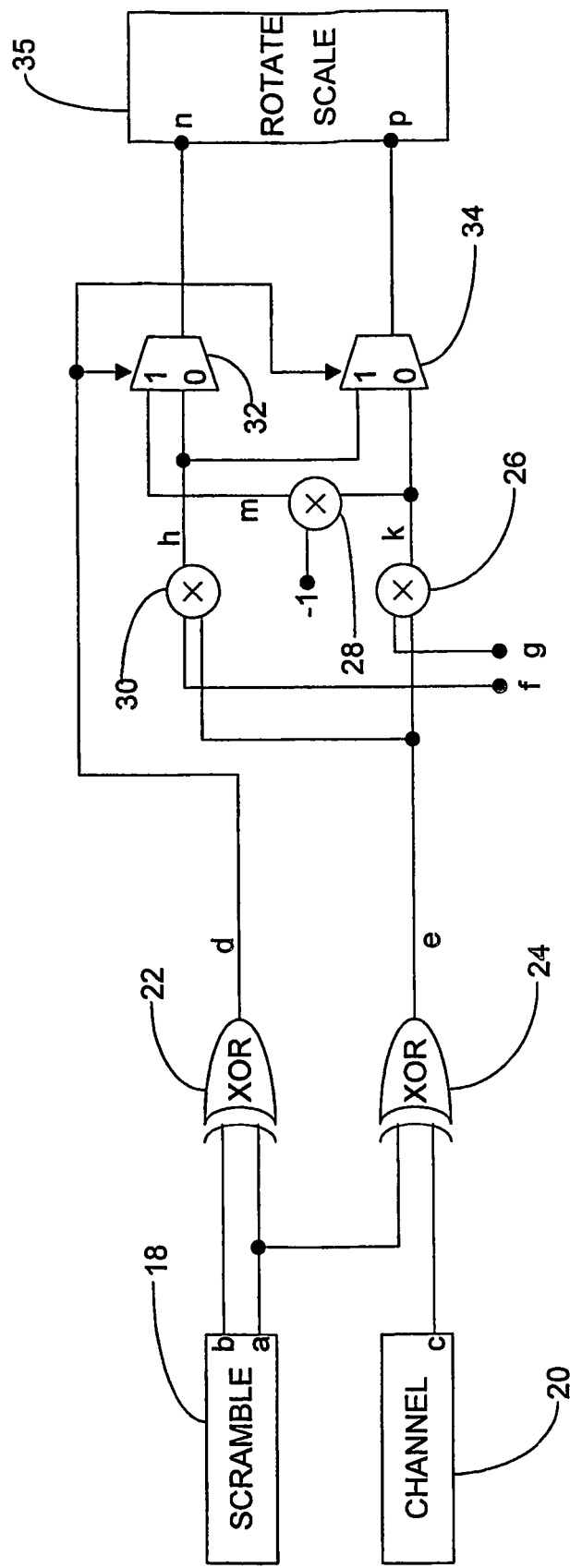
FIG. 2 illustrates a circuit used within the chip rate processor of FIG. 1 to achieve spreading or despreading.

In FIG. 2, two spreading codes are to be applied to signals undergoing spreading/despreading. The two spreading codes are a scrambling code and a channelisation code. The scrambling code is provided by a scrambling code source 18 and the channelisation code is provided by a channelisation code source 20. The signal that is undergoing spreading or despreading is applied to terminals f and g and the output of the process is taken from terminals n and p.

The scrambling code is complex and each of its sequence of values takes the form of one of the following complex numbers: 1+j, 1−j, −1+j and −1−j. In binary format, these complex numbers are represented by two bit words, in which the first and second bits of the word represent the real and imaginary parts of the complex numbers, respectively. The binary value 0 is used to represent the decimal value +1 and the binary value 1 is used to represent decimal value −1. Accordingly, the aforementioned complex numbers translate into 00, 01, 10 and 11, respectively, in binary form. The channelisation code on the other hand, is wholly real-valued and can take the decimal values of +1 and −1. These values are rendered as 0 and 1, respectively, in binary form.

In FIG. 2, the real and imaginary binary parts of each value of the scrambling code are applied to terminals a and b, respectively. The binary values of the channelisation code are applied to terminal c. The signal which is undergoing spreading or despreading comprises a sequence of complex values. The real and imaginary binary parts of each value of this signal are applied to terminals f and g respectively. The output signal is taken from terminals n and p and has the same binary complex format as the signal applied to terminals f and g. The numbers applied to each of terminals f, g, n and p may be multiple bits in width.

The signals a, b and c are applied to the inputs of XOR gates 22 and 24. The output d of XOR gate 22 is the result of performing the XOR operation on the binary parts of the complex scrambling code value. The output e of XOR gate 24 is the result of performing an XOR operation on the channelisation code value c and the real part a of the scrambling code value. The truth table for the XOR gates 22 and 24 is shown in FIG. 3.

The part of the circuit of FIG. 2 that processes signals d and e comprises three multipliers 26, 28 and 30 and two multiplexers 32 and 34. Multipliers 26 and 30 produce two product signals k and h respectively that are the results of multiplying signal e with signals g and f respectively. Product signal h is supplied to inputs of both multiplexers 32 and 34. Product signal k is supplied to an input of multiplexer 34. Additionally, product signal k is supplied to multiplier 28 where it is multiplied by the decimal value −1 to produce product signal m. In other words, multiplier 28 acts as an inverter to change the sign of product signal k. Product signal m is supplied to an input of multiplexer 32. Signal d is applied to the control inputs of both multiplexers 32 and 34 and therefore controls which one of the two inputs of each multiplexer is passed to the output of the multiplexer. If signal d has the binary value 1 then product signal m is passed to terminal n and product signal h is passed to terminal p. If signal d has the binary value 0, then product signal h is passed to terminal n and product signal k is passed to terminal p. As mentioned earlier, the signals at terminals n and p form the real and imaginary components of the complex-valued output signal. FIG. 4 provides a truth table giving the outputs at n and p as a function of the inputs applied to the aforementioned terminals.

The circuit shown in FIG. 2 is capable of performing both despreading and spreading. If a chip rate signal is applied to terminals f and g, then the results emerging at terminals n and p can be accumulated over symbol periods to recover a symbol rate signal. Conversely, if the signal applied to terminals f and g is at the symbol rate, then a chip rate signal can be taken from terminals n and p. The complex values applied to terminals f and g and supplied from terminals n and p are typically multiple bits in length. The durations over which the values applied to terminals a, b, c, f and g are held will dictate whether spreading or despreading is performed, as will be apparent to the skilled person. It should also be borne in mind that, if a spreading operation is defined as the multiplication of a complex data value v by a complex spreading code u, then the corresponding despreading process performed on a complex received signal value v is defined as $v \cdot u^*$.

The calculation performed by the circuit of FIG. 2 is:

$$(a-bj) \cdot c \cdot \tfrac{1}{2}(1+j) \cdot (f+jg)$$

Thus, if the circuit is being used to scramble using a code of a−bj to produce a result s+tj then the output of the circuit, in terms of s+tj, is:

$$\tfrac{1}{2}(1+j)(s+tj)$$

On the other hand, if the circuit is being used for despreading to counteract the effects of scrambling using a code a+bj to produce a despread result w+zj, then the output of the circuit, in terms of w+zj, is:

$$\tfrac{1}{2}(1+j)(w+zj)$$

In both cases, it will be apparent that the desired result is distorted by an amount $\tfrac{1}{2}(1+j)$. This distortion can be corrected by a scaling unit 35 which multiplies n+pj by 1−j since $\tfrac{1}{2}(1+j) \cdot (1-j) = 1$. In some embodiments, it may be unnecessary to perform such scaling, as will now be described.

In a UMTS system, a pilot signal containing reference data is often transmitted alongside one or more data signals. The reference data contained in the pilot signal will be known to a receiver acquiring the pilot signal and the received pilot signal can be used to make channel measurements, i.e. measurements of the properties of the environment through which the pilot signal propagated. Since the data signals will have travelled through the same environment as the pilot signal, the channel measurements can be used to correct the received data signals. If it is arranged that a data signal and a pilot signal are both spread using a circuit of the kind shown in FIG. 2, then both the data and pilot signals will suffer from distortion by the $\tfrac{1}{2}(1+j)$ factor. However, the channel measurements made by a receiver on the pilot signal would detect the $\tfrac{1}{2}(1+j)$ factor and the application of the channel estimates to the correction of the data channel would correct the data channel for the $\tfrac{1}{2}(1+j)$ factor. Thus, a scaling circuit is not needed in the transmitter. Likewise, if a receiver were to despread pilot and data signals using a circuit of the type shown in FIG. 2, the distortion of the pilot signal by $\tfrac{1}{2}(1+j)$ in the receiver would cancel out the equivalent distortion in the data signal.

If the output n+pj is to be used for a power calculation, or the like, in which the square of its modulus is required, then the phase part of the distortion factor $\tfrac{1}{2}(1+j)$ can be ignored although one would still have to take account of the spurious halving of the squared modulus (unless one were comparing the moduli of signals all generated in the same way and all featuring the ½ factor). Such calculations can be used in a receiver (i.e. where the circuit of FIG. 2 is being used for despreading) to measure signal power which is then used to detect the presence, and timing of, incoming signals.

The outputs d and e in FIG. 2 have an additional significance if one notionally scales the channelisation code by the complex number 1+j. This rotates the channelisation code anti-clockwise by 45° in the complex plane. The channelisation code then takes only values 1+j and −1−j. If the channelisation code is taken to have this complex format, then the product of the complex scrambling code and the content of the complex channelisation code can only assume values which are wholly real or wholly imaginary and which are either negative or positive. In this scenario, values of binary 0 and binary 1 at output d indicative that this product is real and imaginary, respectively, and values of binary 0 and binary 1 at output e indicate that this product is positive and negative, respectively.

Figure 8:
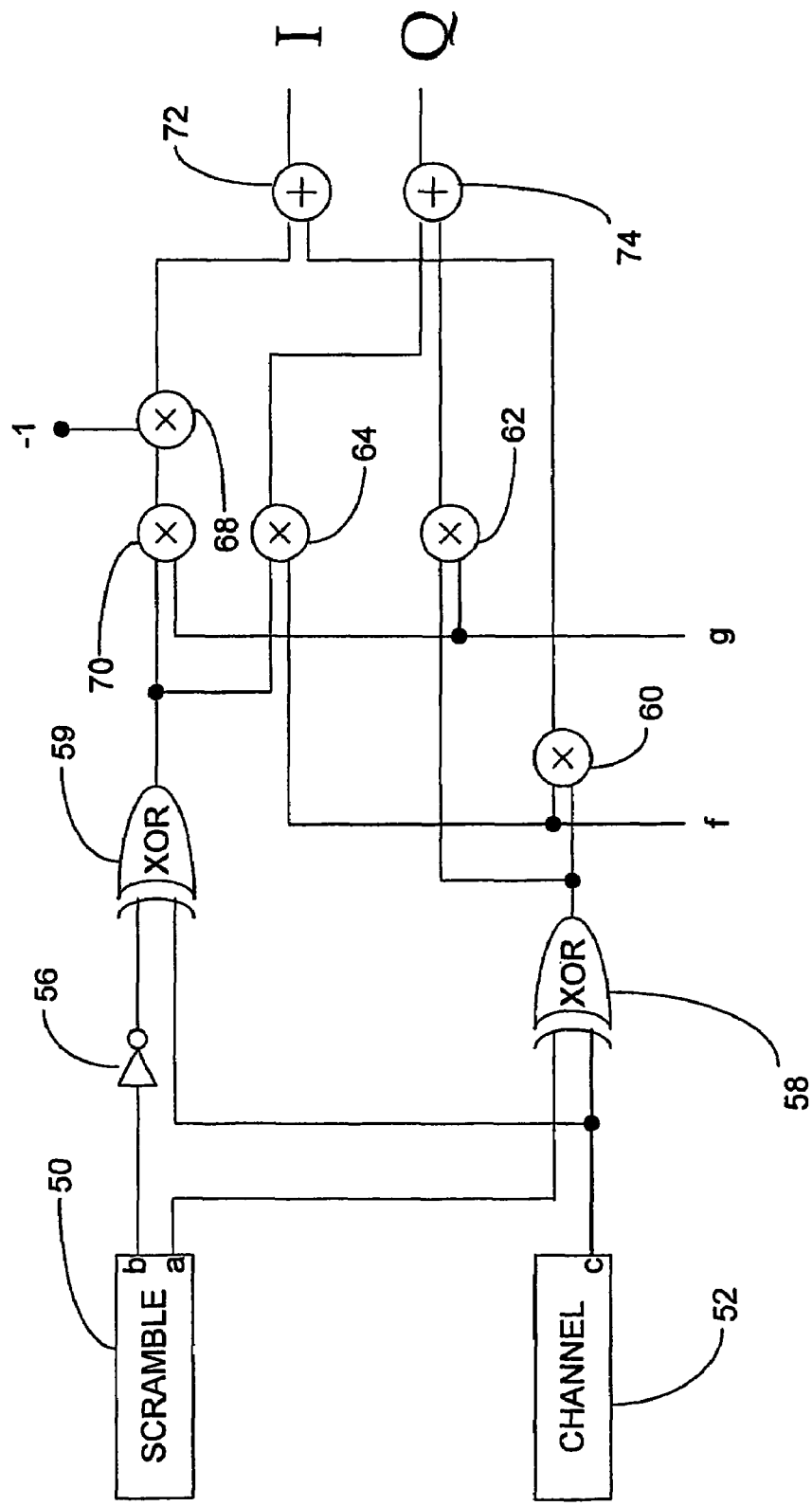
FIG. 8 illustrates a prior art circuit for performing spreading or despreading.

If one compares the circuits of FIGS. 2 and 8, it will be apparent that the circuit of FIG. 2 takes up less silicon area as it omits the adders of and two of the multipliers of, FIG. 8. Admittedly, FIG. 2 utilises two multiplexers instead but there is still a net saving in silicon area.

Figure 5:
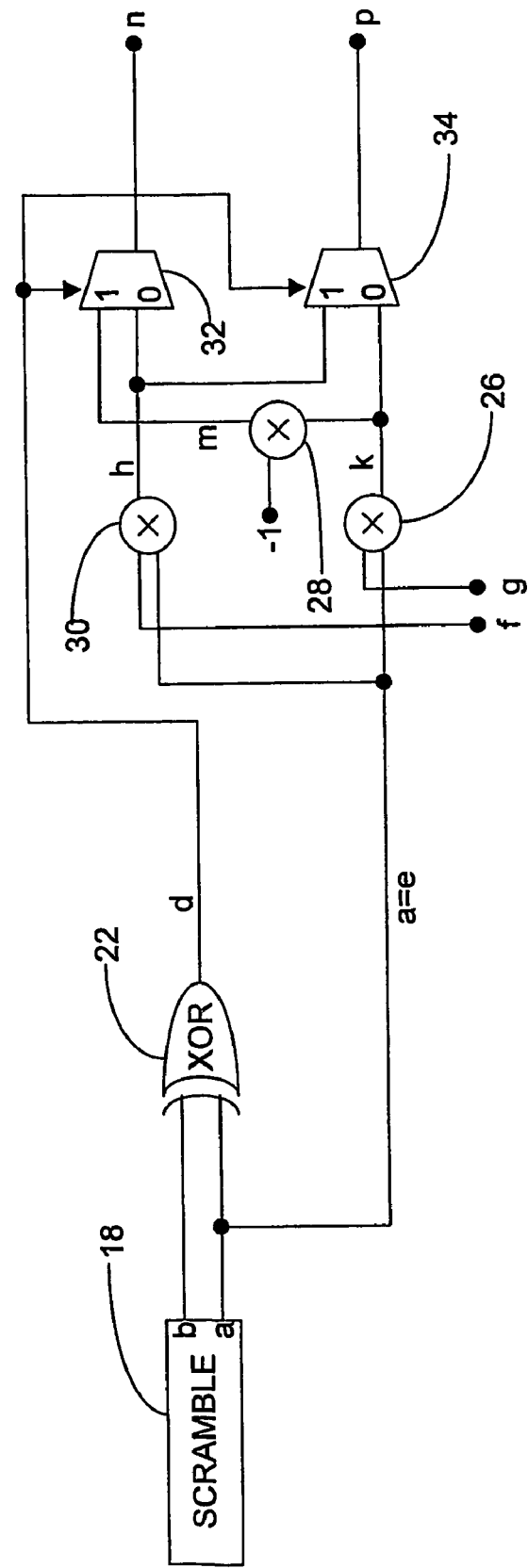
FIG. 5 illustrates another circuit that could be used within the chip rate processor of FIG. 1 to achieve spreading or despreading.

FIG. 5 shows an alternative construction for the circuit of FIG. 2, catering for the situation where only a scrambling code is used. The circuit of FIG. 5 is equivalent to fixing the value of c to binary 0 in FIG. 2. In FIG. 5, the evolution of signal d is the same as in FIG. 2 whereas signal e is now simply the same as signal a. The production of the output signal at terminals n and p from the input signal at terminals f and g using values d and e is unchanged and follows the truth table given in FIG. 4.

Figure 7:
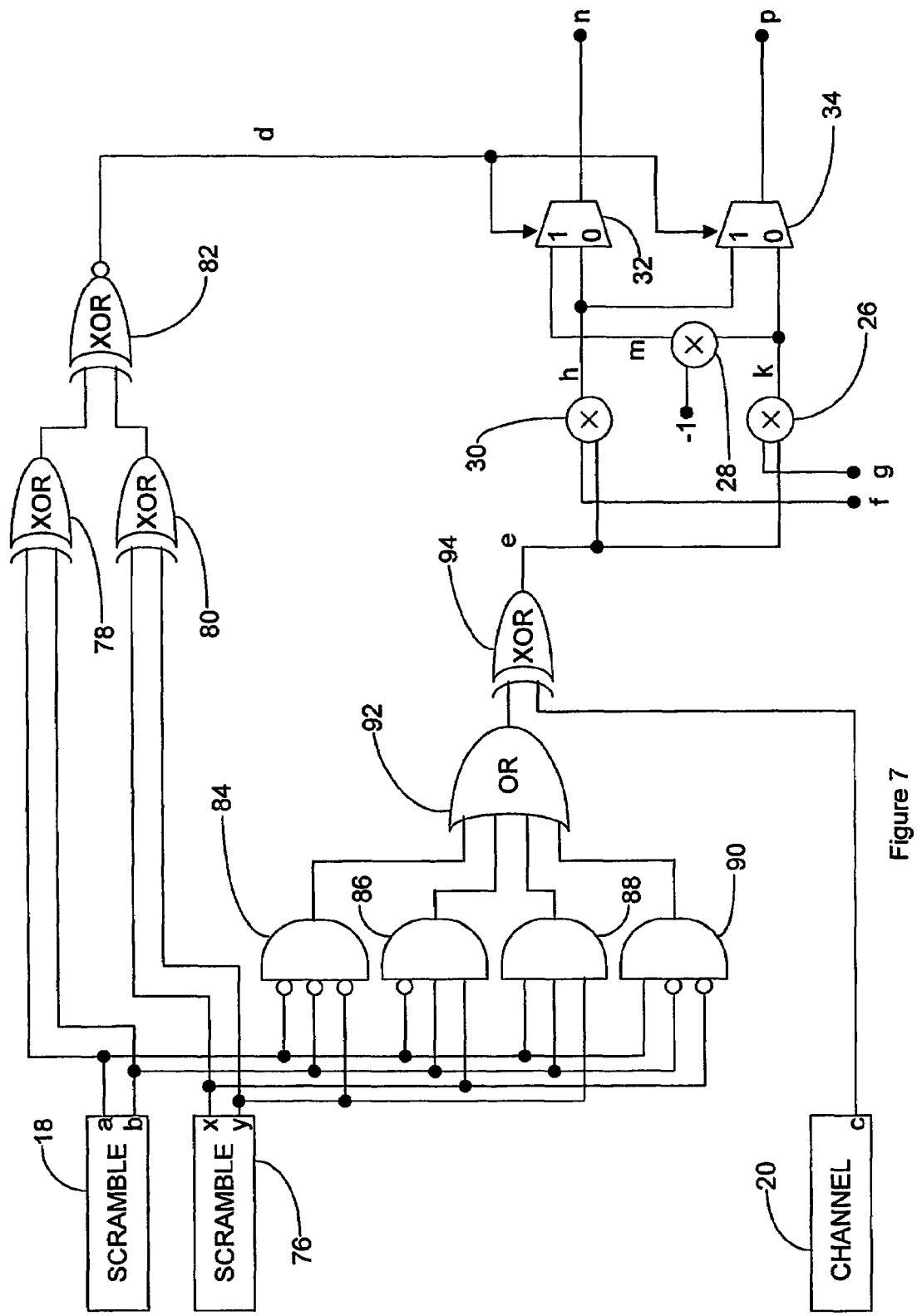
FIG. 7 illustrates another circuit that could be used within the chip rate processor of FIG. 1 to achieve spreading or despreading.

The 3GPP standards require some data channels to contain predetermined symbols at predetermined positions in the channel. These symbols form a pilot sequence (distinct from the pilot signal mentioned earlier). A receiver can correlate the known pilot sequence against a signal received through such a channel in order to track the timing of the incoming signal. The symbols in the pilot sequence are complex numbers and all of the complex components of the symbols share the same magnitude. However, the signs of complex components may vary within and between symbols. The correlation of such a pilot sequence against a received symbol train can be regarded as despreading the symbol train using the pilot sequence. Or to put it another way, the pilot sequence can be treated as a spreading code. FIG. 7 shows an embodiment which implements such an approach.

The part of the circuit of FIG. 7 that utilises the signals d and e operates in the same way as described in the previous embodiments. The circuit of FIG. 7 also retains the scrambling code source 18 and the channelisation code source 20. However, these entities are now complemented by a further scrambling code source 76 which provides the conjugate pilot sequence symbols in the form x−yj. The circuit of FIG. 7 aims to multiply together the quantities a−bj, x−yj, c and f+gj. However, the calculation that is actually performed by the circuit is:

$$\tfrac{1}{2}\cdot(a-bj)\cdot(x-yj)\cdot c\cdot(f+gj)$$

which is a factor of ½ less than the desired result. It should be noted that, in contrast with the circuit of FIG. 2, the factor representing the difference between the actual and desired results is not a complex quantity. Therefore, if a scaling unit is employed in conjunction with the FIG. 7 circuit then the scaling unit does not need to rotate the phase of the output n+pj.

The part of the circuit that produces the signals d and e from the three code sources will now be described.

The signals a and b are input to an XOR gate 78 and the signals x and y are input to another XOR gate 80. The outputs of these two XOR gates then become the inputs to a further XOR gate, 82. The output of XOR gate 82 is altered by a NOT function (as indicated by the circle following the XOR gate) in order to produce signal d.

The signals a, b, x and y are also provided to various inputs of a row of four three-input AND gates 84-90. AND gates 84 and 88 each receive signals a, b and y and AND gates 86 and 90 each receive signals a, b and x. All of the inputs to AND gate 84 are altered by NOT functions, as are input a to AND gate 86 and inputs b and x to AND gate 90.

The outputs of the AND gates 84-90 are supplied to a four-input OR gate 92. The output of the OR gate 92 and the channelisation code value c are then provided as the inputs of an XOR gate 94, whose output is signal e.

The output symbols, n+pj, can be accumulated over a suitable period in order to correlate the pilot sequence from scrambling source 76 against a data signal that has been subjected to spreading by scrambling code a+bj and channelisation code c.

Moreover, it will be apparent that the circuit of FIG. 7 could also be used to introduce a pilot sequence to a signal that is destined for transmission. As shown, FIG. 7 would illustrate the application of a pilot sequence x−yj to a signal that is being scrambled by a code a−bj.

Above, circuits have been described which use one or two scrambling codes with zero or one channelisation codes. On the basis of the foregoing description of those circuits, it is possible, as would be understood by a person skilled in the field of the invention, to extrapolate and produce different circuits that apply various numbers of scrambling and channelisation codes to a signal, simply by redesigning the logic circuit that produces the signals d and e from the scrambling and, if any, channelisation code or codes.

To aid an understanding of how the invention can be extended to various other spreading code combinations, it is useful to characterise the spreading codes in terms of the following code types (using unity for real and imaginary magnitudes for the sake of simplicity):

Type 1: 1 or −1 (i.e. wholly real)
Type 2: j or −j (i.e. wholly imaginary)
Type 3: 1+j, 1−j, −1+j or −1−j (i.e. complex)

Forming a product of at least two codes of these types produces another code of type 1-3 or of a fourth type:

Type 4: 1, −1, j or −j (i.e. either wholly real or wholly imaginary)

In fact, it can be seen that the type 1 and 2 codes are merely subsets of type 4, so, henceforth, only types 3 and 4 will be discussed for the sakes of clarity and brevity.

If one forms a product of some codes drawn from type 3 and/or 4 then the resultant code will belong to:

type 3 if the product contains an odd number of type 3 codes.

type 4 if the product contains an even number of type 3 codes.

It will be apparent that the circuits described earlier use the following combinations of code types:

| Figure | Type 3 | Type 4 |
| --- | --- | --- |
| 2 | 1 | 1 |
| 5 | 1 | 0 |
| 7 | 2 | 1 |

Therefore, another way of categorising the variants that may be devised by adjusting the logic circuit that produces signals d and e is to refer to the numbers of type 3 and 4 spreading codes that are input to the logic circuit. If the logic circuit is redesigned to accept $N_1$ type 3 codes and $N_2$ type 4 spreading codes to produce the signals d and e such that the entire circuit overall is aimed at calculating the result $P_r\cdot(f+gj)$, where $P_r$ is the product of all of the spreading codes, then what the entire circuit will in fact produce is:

$$n+pj = (1+j)\cdot P_r\cdot(f+gj)\cdot 2^{-\left(\frac{N_1+1}{2}\right)} \quad \text{if } N_1 \text{ is odd.}$$

$$= P_r\cdot(f+gj)\cdot 2^{-\left(\frac{N_1}{2}\right)} \quad \text{if } N_1 \text{ is even.}$$

Therefore, there is no phase rotation between the desired ($P_r\cdot(f+gj)$) and actual results when $N_1$ is even.

Figure 6:
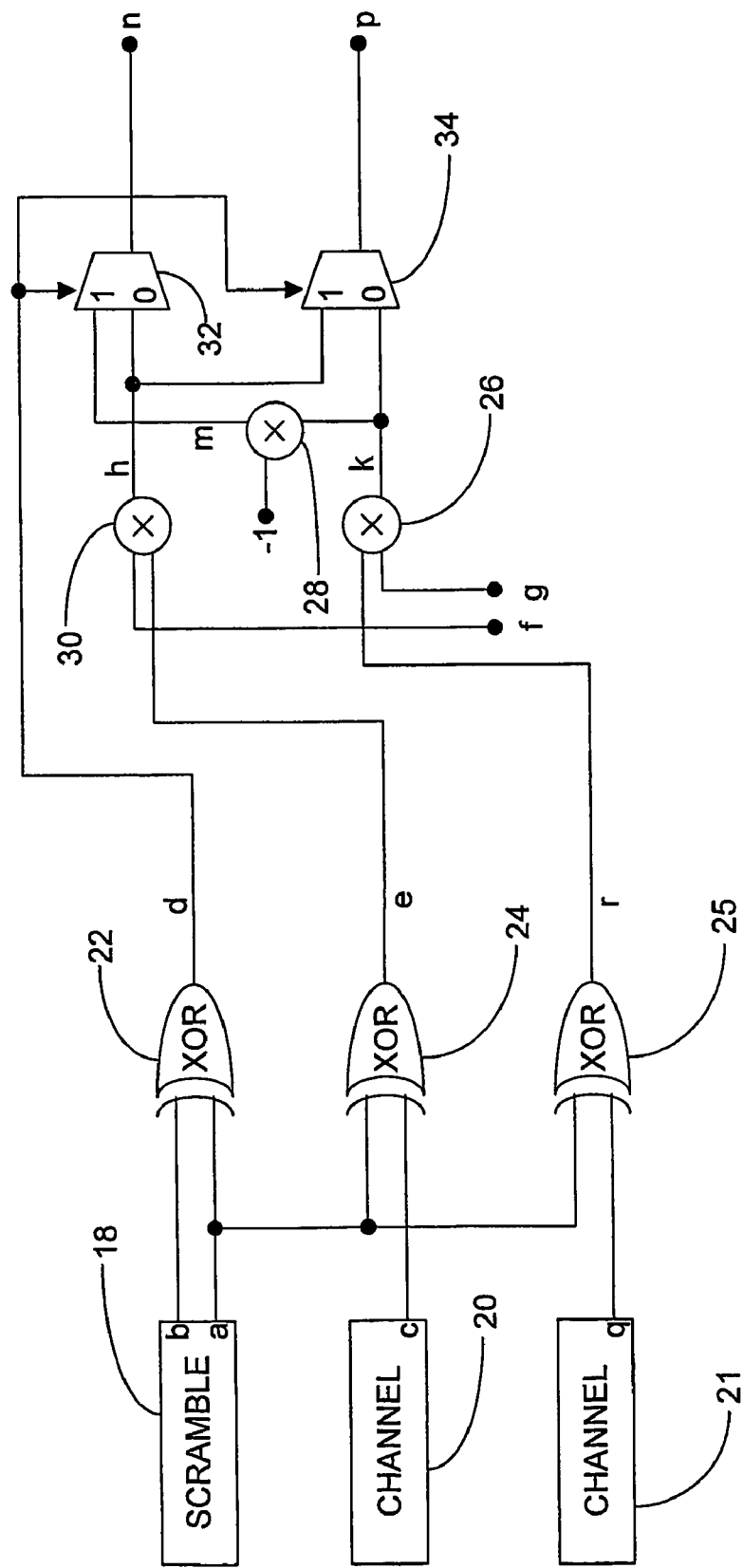
FIG. 6 illustrates another circuit that could be used within the chip rate processor of FIG. 1 to achieve spreading or despreading.

Certain embodiments, such as that of FIG. 6, do not conform to generalisation in terms of types 3 and 4 that was just mentioned. Sometimes, it is desirable to apply separate channelisation codes to the real and imaginary components of input signal values. FIG. 6 shows an arrangement for achieving this. Broadly speaking, the circuit of FIG. 6 has the same construction as the circuit of FIG. 2. Elements in FIG. 6 that appear in FIG. 2 retain the same reference numerals and their function will not be described again. In FIG. 6, the output of XOR gate 24 is now supplied only to multiplier 30 which acts on component f of a presented input signal value. An additional channelisation code generator 21, producing the channelisation code value q, appears in FIG. 6. The channelisation code value q is supplied to an input of a further XOR gate 25. The other input of XOR gate 25 is the signal a from scrambling code generator 18. The output r of XOR gate 25 is supplied to multiplier 26 where it acts on component g of a presented input signal value. In other aspects, the operation of the circuit of FIG. 6 is the same as that of FIG. 2.

The invention claimed is:

1. CDMA communications apparatus for applying one or more code values to an input signal value to produce an output signal value, wherein the code value or values may lie only either on or equidistant from an orthogonal pair of axes defining a two dimensional signal space, the input and output signal values each have components along each axis and the apparatus comprises logic adapted to process the code value or values to produce two multiplier values and a selector value, a multiplier adapted to create two product values by multiplying the multiplier values with respective components of the input signal value, a negator adapted to negate one of the product values to produce a third product value and a selector adapted to select, on the basis of the selector value, two of the three product values to become the components of the output signal value.

2. Apparatus according to claim 1, wherein there is a single code value to be applied to the input signal value, the code value is equidistant from, and has components along, the axes and the logic is adapted to pass one of the code value components as the multiplier values and to XOR the code value components to produce the selector value.

3. Apparatus according to claim 1, wherein there are first and second code values to be applied to the input signal value, the first code value is equidistant from, and has components along, the axes and the second code value lies on one of said axes and the logic is adapted to XOR a first code value component with the second code value to produce a value for use as both multiplier values and to XOR the first code value components to produce the selector signal.

4. Apparatus according to claim 1, wherein there are first, second and third code values to be applied to the input signal value, the first code value is equidistant from, and has components along, the axes, the second and third code values each lie on one of the axes and the logic is adapted to XOR the first code value components with respective ones of the second and third code values to produce the multiplier values and to XOR the first code value components to produce the selector value.

5. Apparatus according to claim 1, wherein there are first, second and third code values to be applied to the input signal value, the first and second code values are each equidistant from, and have components along, the axes, the third code value lies on one of the axes and the logic is adapted to combine the components of the first and second code values to produce the selector value and to combine the components of the first and second code values with the third code value to produce a value which is used as both multiplier values.

6. Apparatus according to claim 1, further comprising a rotator adapted to rotate the output signal value by 45° about the origin of the phase space axes.

7. A method for applying one or more code values to an input signal value to produce an output signal value in a CDMA communications scheme, wherein the code value or values may lie only either on or equidistant from an orthogonal pair of axes defining a two dimensional signal space, the input and output signal values each have components along each axis and the method comprises processing, via a logic function, the code value or values to produce two multiplier values and a selector value, creating two product values by multiplying the multiplier values using a multiplier with respective components of the input signal value, negating one of the product values to produce a third product value and selecting, on the basis of the selector signal, two of the three product values to become the components of the output signal value.

8. A method according to claim 7, wherein there is a single code value to be applied to the input signal value, the code value is equidistant from, and has components along, the axes and the processing step comprises passing one of the code value components as the multiplier values and XORing the code value components to produce the selector signal.

9. A method according to claim 7, wherein there are first and second code values to be applied to the input signal value, the first code value is equidistant from, and has components along, the axes and the second code value lies on one of said axes and the processing step comprises XORing a first code value component with the second code value to produce a value for use as both multiplier values and XORing the first code value components to produce the selector signal.

10. A method according to claim 7, wherein there are first, second and third code values to be applied to the input signal value, the first code value is equidistant from, and has components along, the axes, the second and third code values each lie on one of the axes and the processing step comprises XORing the first code value components with respective ones of the second and third code values to produce the multiplier values and XORing the first code value components to produce the selector value.

11. A method according to claim 7, wherein there are first, second and third code values to be applied to the input signal value, the first and second code values are each equidistant from, and have components along, the axes, the third code value lies on one of the axes and the processing step comprises combining the components of the first and second code values to produce the selector value and combining the components of the first and second code values with the third code value to produce a value that is to be used as both multiplier values.

12. A method according to claim 7, further comprising rotating the output signal by 45° about the origin of the phase space axes.

13. Radio apparatus capable of CDMA communications and comprising the apparatus of claim 1.

14. A mobile phone of a wireless-communications network using a CDMA communications scheme, the mobile phone comprising the apparatus of claim 1.

* * * * *

UNITED STATES PATENT AND TRADEMARK OFFICE
CERTIFICATE OF CORRECTION

PATENT NO. : 7,519,104 B2  Page 1 of 1
APPLICATION NO. : 10/547426
DATED : April 14, 2009
INVENTOR(S) : Daniel Edward Alt It is certified that error appears in the above-identified patent and that said Letters Patent is hereby corrected as shown below:

On the front page of the patent, (73) Assignees: replace the following:

"MStar Software R&D, Ltd., Shenzen (TW);
MStar France SAS, Issy les Mouineaux (FR)"

with the following:

-- MStar Software R&D, Ltd., Shenzhen (CN)
MStar France SAS, Issy les Moulineaux (FR) --

Signed and Sealed this

Twelfth Day of October, 2010

David J. Kappos
*Director of the United States Patent and Trademark Office*